Figure 1:
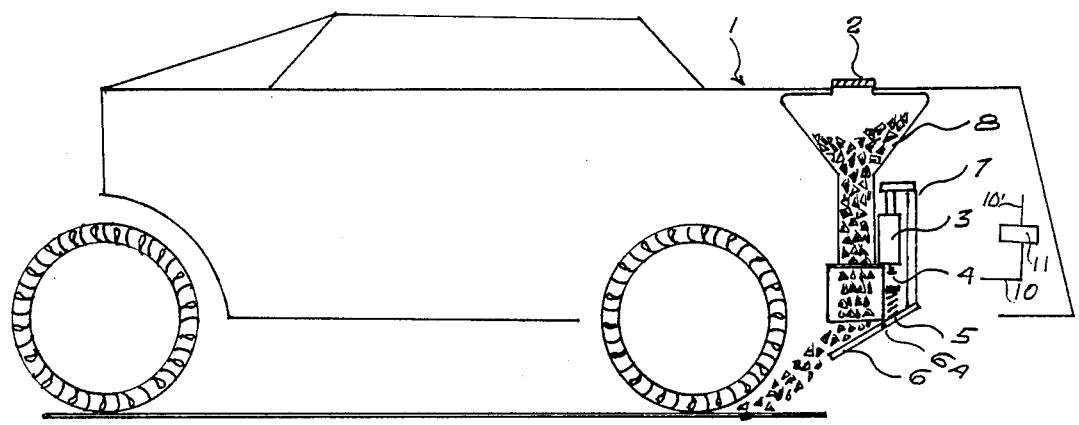

United States Patent [19]

Quinn et al.

[11] Patent Number: 4,852,949
[45] Date of Patent: Aug. 1, 1989

[54] TRACTION CONTROL SYSTEM

[76] Inventors: Michael H. Quinn; Paul H. Quinn, both of 175 Beech Ridge Rd., Scarborough, Me. 04074

[21] Appl. No.: 102,130

[22] Filed: Dec. 7, 1987

[51] Int. Cl.⁴ .................. B60T 8/58; B60T 17/00; B60B 39/10
[52] U.S. Cl. .................. 303/100; 303/1; 291/16; 291/23; 291/38; 291/41
[58] Field of Search .................. 291/1, 3, 16, 22, 23, 291/25, 38, 41, 47; 222/462, 504, 556, 626; 264/82; 188/4 R, 5; 303/1, 50, 93, 100

[56] References Cited

U.S. PATENT DOCUMENTS

| Re. 26,275 | 10/1967 | Stevens | 222/504 |
|---|---|---|---|
| 533,242 | 1/1895 | Starkweather | 291/25 |
| 1,266,055 | 5/1918 | Sackermann | 291/25 |
| 1,690,090 | 10/1928 | Hendricks | 222/504 |
| 2,019,502 | 11/1935 | Osgood | 222/504 |
| 3,271,061 | 9/1966 | Miller | 291/16 |
| 3,774,945 | 11/1973 | Lee et al. | 291/23 |
| 3,870,352 | 3/1975 | Engler et al. | 291/38 |
| 3,931,934 | 1/1976 | Smith | 222/504 |
| 4,012,062 | 3/1977 | Gropp, Sr. | 291/25 |
| 4,093,690 | 6/1978 | Murray | 264/82 |
| 4,099,688 | 7/1978 | Jayne | 291/3 X |
| 4,767,063 | 8/1988 | Wall et al. | 222/626 |

OTHER PUBLICATIONS

"Car Device Spreads Grit on Icy Roads", The Washington Post, Feb. 11, 1961.

Primary Examiner—Andres Kashnikow
Assistant Examiner—Timothy Newholm

[57] ABSTRACT

This invention consists of a funnel mounted near the wheel well of a vehicle, which contains marble chips and is activated when a button located on the steering wheel is depressed. The flow of marble chips continues until the button is depressed a second time.

3 Claims, 1 Drawing Sheet

U.S. Patent    Aug. 1, 1989    4,852,949

TRACTION CONTROL SYSTEM

An economically constructed anti-skid braking system in which marble chips are released from a funnel shaped container which is located in close proximity to the vehicle wheel. The container can be shaped to fit various sized vehicle wheel-wells.

The release of the marble chips is ultimately accomplished by a solenoid mechanism which is electrically activated by pressing a button located on the steering wheel.

The goal of this system is to prevent the vehicle skidding under poor driving conditions, such as icy or wet pavement. Among some of the distinguishing characteristics of this invention are its relative low cost and effectiveness.

Other previous anti-skid systems have involved complicated electronics and rely strictly on manipulations of the car braking system.

This invention compares to an anti-skid brake system, but it is inexpensive and most importantly more effective.

This invention enables vehicles big and small to stop quickly even in the worst driving conditions. Because this system is relatively simple in nature, it can be easily maintained by each and every vehicle operator.

Under poor driving conditions such as wet highways, as well as icy highways, applying the brakes usually results in the locking of one or more wheels. Without locking all the wheels with a simple push of a button, this invention enables the wheels to roll over the marble chips, therefore making the vehicle stop with ease under any type of driving situation. When the funnal is empty an indicator light will come on to warn the driver.

The release of the marble chips from the front of the vehicle will also benefit the rear wheels and any another vehicles preceding. The funnel can be easily refilled with the marble chips in a matter of seconds. To prevent jackknifing, all tractor trailer vehicles will be equipped with the invention not only in the front but also in the rear of the box to ensure 100% braking capabilities.

This invention not only lets the vehicle stop at any given time, but it will benefit the vehicle in a so-called "stuck" situation.

Numerous other objects, advantages and features of this invention will become apparent with reference to the drawings shown in FIG. (1) one, FIG. (2) two and FIG. (3) three.

FIG. (1) one is the showing of the entire vehicle and where this invention sits in relation of the vehicle. The proximity of this invention would also hold true in large vehicles.

FIG. (2) two diagrams the major parts of this invention.

FIG. (3) three is the easy re-fill container that holds the various sized marble chips. This container can be easily stored and handled by each and every vehicle operator.

Referring now to the drawings in detail and particularly to FIG. (2) two which breaks down the major parts of the invention. The funnel has a frustoconical shaped top portion for receiving and storing said marble chips, and a dispensing portion extending vertically downward from said top portion and having an upper portion of substantially constant cross section and a lower portion having a cross section that is greater than that of said upper portion to allow free flow of marble chips therethrough. The opening of the funnel 2 can be easily re-filled by the operator using the refill container shown in FIG. (3). The cylinder 3 opens the funnel door, which is pivotably attached to a horizontal opening of the dispensing portion, when the electronic sensor 4 is activated. The spring 5 is in place to assist in closing the funnel door 6 after the marble chips have been discharged. A hinge 6A helps to swing the funnel door open and closed when the invention is activated. When the solenoid is electronically activated the rod 7 vertically moves the funnel door 6 to pivot same about pivot 6A to release the marble chips from the funnel. The funnel 8 houses the marble chips that enable the vehicle to stop under the worst driving conditions. The marble chips are preferably between ¼ inch and ½ inch in diameter. The electric wire 10 that leads from a push button on the vehicle steering wheel 11 activates the cylinder to open the funnel door and release the marble chips as needed.

In this system, material can be used other than marble chips, such as sand, or man-made (chemically made) chips.

OPERATION OF PREFERRED EMBODIMENT

The manner of operation of the first embodiment will be explained.

Figures 2, 3:
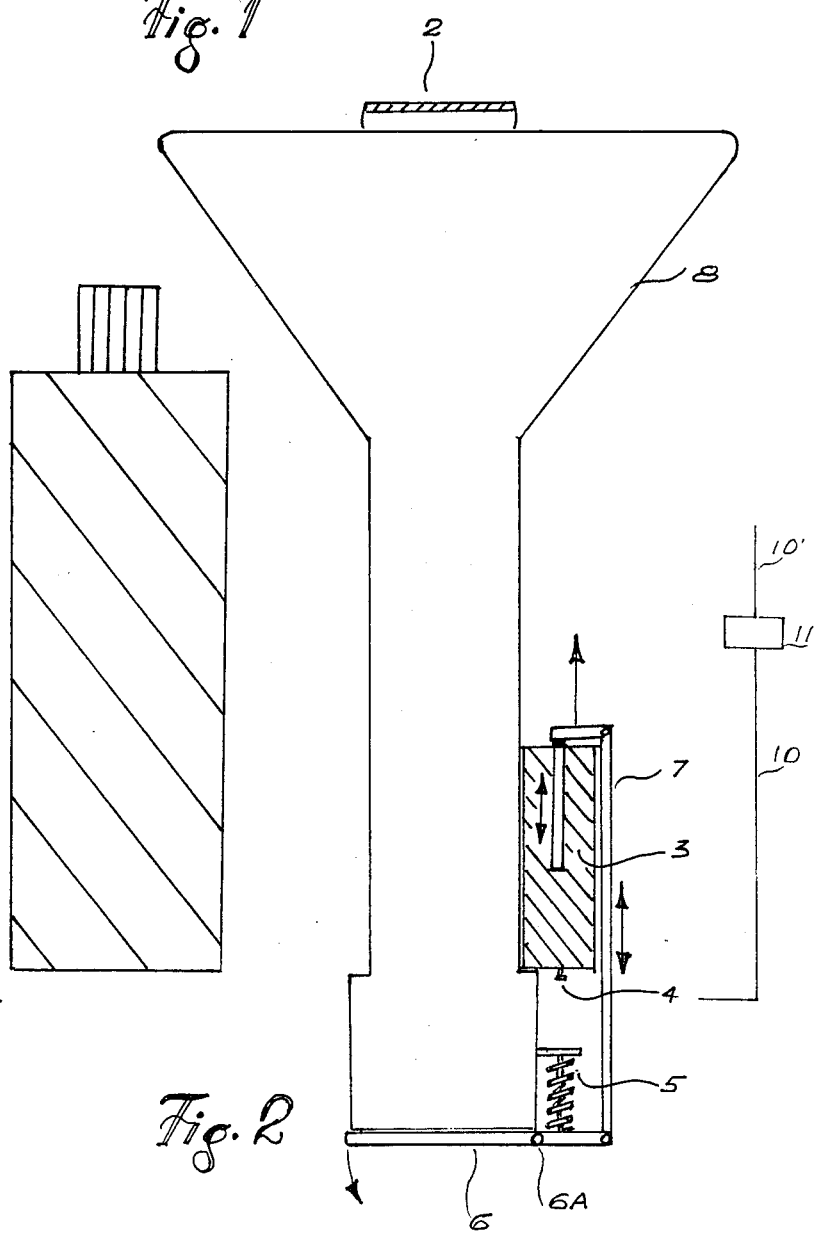

In reference to the drawing of FIG. 2, it can be seen that the funnel 8 which contains the marble chips is activated when a button on the steering wheel 11 is depressed. Once this button is depressed, the electromagnetic solenoid 3 moves the push rod 7 which opens the door 6 to the funnel by pivoting on a hinge 6A. In a preferred embodiment, the marble chips flow out of the funnel at the rate of one kilogram per three seconds. Once the button is pushed for a second time, the door 6 to the funnel 8 closes and shuts off the marble chip flow.

We claim:

1. A traction control system for an automotive vehicle comprising a container filled with marble chips and mounted vertically to said vehicle in front of a wheel of said vehicle, said container comprising a frusto-conical shaped top portion for receiving and storing said marble chips, and a dispensing portion extending vertically downward from said top portion and having an upper portion of substantially constant cross section and a lower portion having a cross section that is greater than that of said upper portion to allow free flow of marble chips therethrough; said container further comprising a door pivotably attached via a hinge means to a horizontal opening located on the outside of said container; said door being opened by a solenoid means, which when energized, is operable to vertically move a push rod attached to said door to open said door in opposition to the force of said spring, said system further comprising an operator controlled switch means which actuates said solenoid when a control operation is desired in order to open said door, thereby allowing said chips to flow underneath said wheel and improve the traction between the wheel and the road; and wherein said marble chips are at least ¼ inch in diameter and the dispensing portion of said container is dimensioned such that the flow rate of said chips out of said container during a control operation is one kilogram per three seconds.

2. The system of claim 1, wherein said marble chips are between ¼ inch and ½ inch in diameter.

3. The system of claim 1 wherein said wheel is a front wheel of said vehicle, and said container is mounted to a wheel well of said front wheel.

* * * * *